Sept. 23, 1941.　　　G. E. ONISHI ET AL　　　2,256,724
AUTOMOBILE HEATING SYSTEM
Filed June 16, 1938　　　3 Sheets-Sheet 2
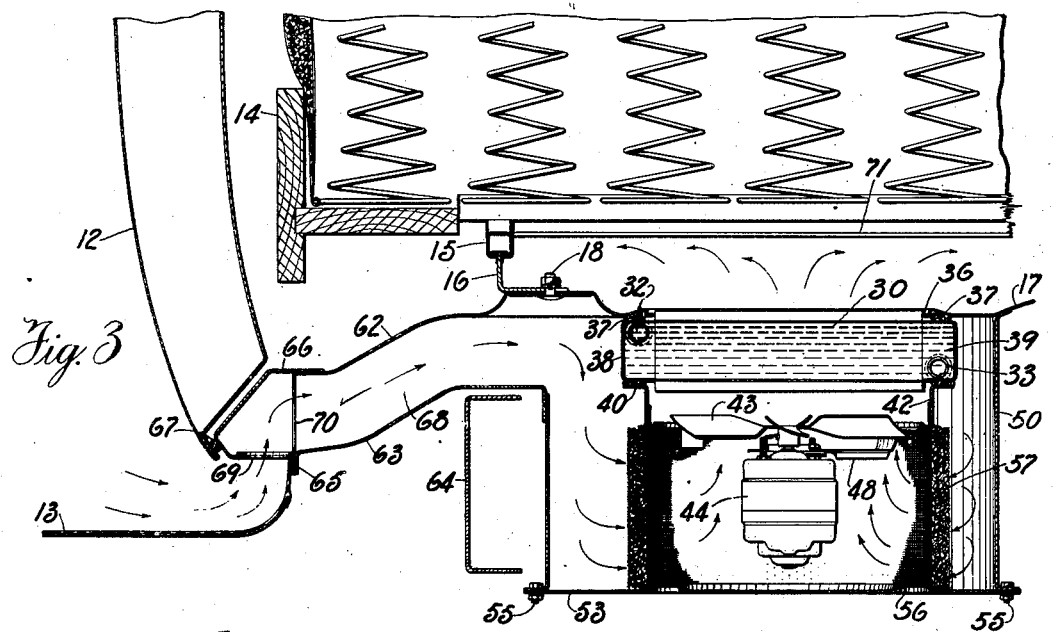
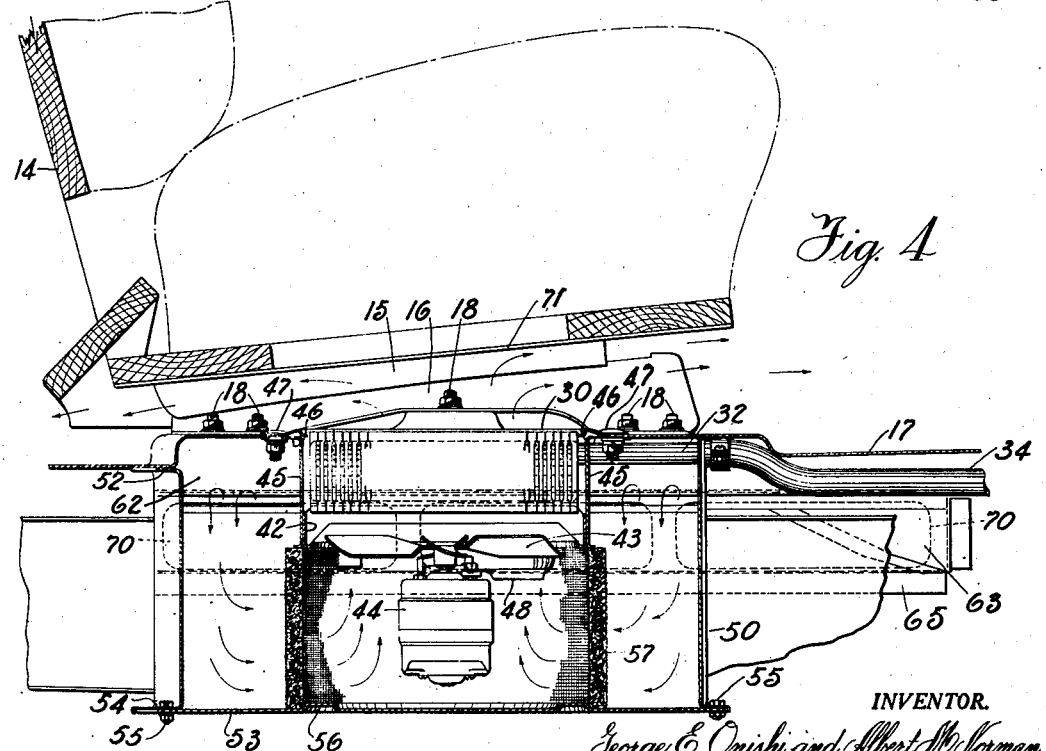
INVENTOR.
George E. Onishi and Albert M. Norman.
BY Walter E. Schirmer
ATTORNEY.

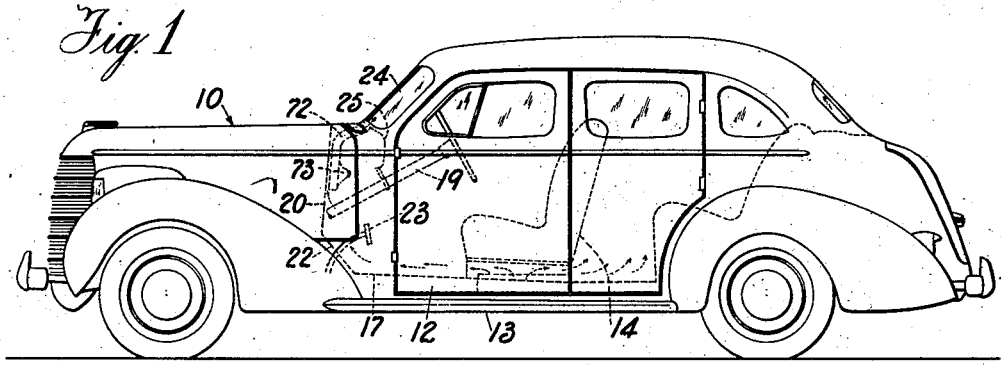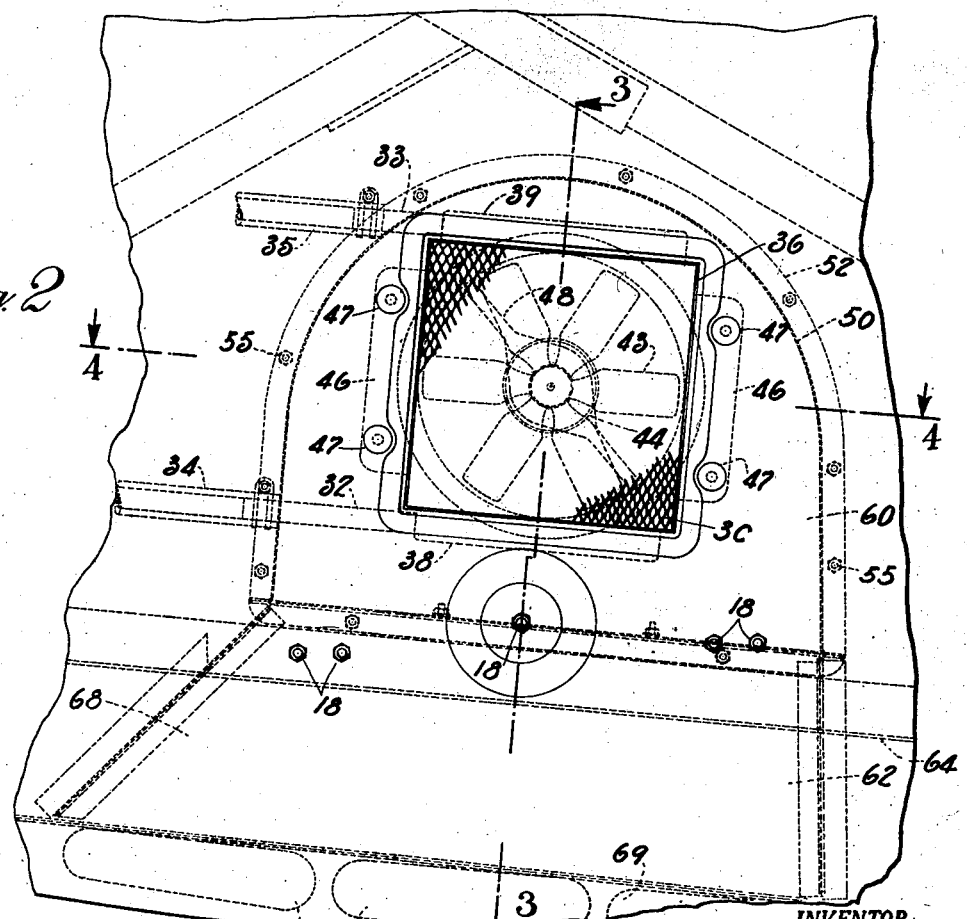

Sept. 23, 1941.   G. E. ONISHI ET AL   2,256,724
AUTOMOBILE HEATING SYSTEM
Filed June 16, 1938   3 Sheets-Sheet 3

INVENTOR.
George E. Onishi and Albert M. Norman
BY Walter E. Schirmer
ATTORNEY.

UNITED STATES PATENT OFFICE 2,256,724

AUTOMOBILE HEATING SYSTEM

George E. Onishi and Albert M. Norman, South Bend, Ind., assignors to The Studebaker Corporation, South Bend, Ind., a corporation of Delaware Application June 16, 1938, Serial No. 214,004

13 Claims. (Cl. 98—2)

This invention relates to automobile heating systems, and more particularly is directed to a system which will improve the circulation of heated air within the vehicle and effect a more uniform temperature throughout all parts of the vehicle.

In conventional heating systems as now used in passenger and commercial automotive vehicles, the heating means is disposed adjacent the bulkhead or dashboard of the vehicle, and has an outlet controlled by louvres, baffles or the like for directing air from the heater into the forward compartment of the vehicle. This results in a very ineffective distribution of heat, due to drafts within the vehicle, and the fact that the fan has not sufficient force to effect any widespread distribution of the heated air. Also, the baffles retard free flow of the heated air and also are cumbersome, subject to rattling, and in general undesirable.

In such systems, it is practically impossible to obtain any effective heating of the rear seat compartment, and additional heating means is required for this purpose. Another disadvantage of prior heating systems, especially of the hot water type, has been the recirculation of vitiated air which is unhealthy and undesirable.

The present invention contemplates the provision of a heating system wherein the air is continuously introduced into the interior of the car under sufficient pressure to prevent any infiltration of unconditioned air through window or door cracks, or in any other manner, and provides for exhaust of such air by exfiltration, fresh air being continuously drawn into the system.

One of the main objects of the present invention is to eliminate from the space at the toe board and dashboard, heretofore occupied by the heater, any heating means, and to dispose the heating mechanism beneath the front seat, out of sight and occupying no space required for the comfort of the occupants of the vehicle.

This produces distinct advantages in that the heated air is introduced along the floor of the car, both forwardly and rearwardly, where cold drafts are most likely to be encountered, and assures warmth at the feet of the occupants, which was not attainable to any appreciable extent in prior types of heating units.

Another feature of the present invention resides in drawing the fresh air into the heating system from beneath the door and above the running board. This assures a clean supply of fresh air in no way contaminated by engine fumes or the like, with the inlet adequately protected from rain and dust. The use of such an inlet also eliminates engine noises and wind effects due to rapid forward movement of the vehicle.

Still another advantage obtained in the present system is the utilization of the base of the seat assembly as a means of directing the heated air from the system out laterally along the floor of the car in all directions. A portion of this heated air flows forwardly and upwardly into the space between the instrument panel and dashboard, where suitable means may be provided to utilize this portion of the air for defrosting purposes by directing it over the windshield. Normal convection currents cause the heated air to rise from the floor, insuring a substantially uniform heating of the entire interior of the car, thus preventing frosting up of any of the windows and at the same time insuring comfort to all occupants.

It is also contemplated, in the present invention, to provide a system wherein air can be drawn into the heater from either side of the vehicle, and wherein either one or two heating means can be employed, depending upon wind conditions and temperatures desired. This insures a more than adequate supply of fresh air for all purposes, and at the same time occupies no additional space within the body of the car.

In this connection it may be desirable at times to effect some humidification of the air within the car. This may be accomplished by employing a suitable hydrostatic control for admixing a certain amount of return air with the fresh air, inasmuch as the return air is humidified by the occupants of the vehicle due to the moisture exhaled with each breath. This is adequate to insure comfortable conditions of temperature and humidity within the vehicle.

Still another advantage of the present invention is the mounting of the duct means, fan and heater below the floor of the car, taking up no body space, and disposed in such manner as to reduce to an appreciable extent any noises incident to operation of the system. This is further enhanced by the resilient noise insulation employed in the mounting of the assembly, thereby providing no transmission of vibrations of operation in the interior of the car.

Other objects and advantages of the present invention will appear more fully from the following detailed description which, taken in conjunction with the accompanying drawings, will disclose to those skilled in the art the particular construction and operation of a preferred form of the present invention.

In the drawings:

Figure 1 is a side elevational view of a vehicle embodying the present invention;

Figure 2 is a plan view, from the floor board of the apparatus employed in the present heating system;

Figure 3 is a sectional elevational view, taken substantially on line 3—3 of Figure 2;

Figure 4 is a sectional elevational view taken substantially on line 4—4 of Figure 2;

Figure 5:
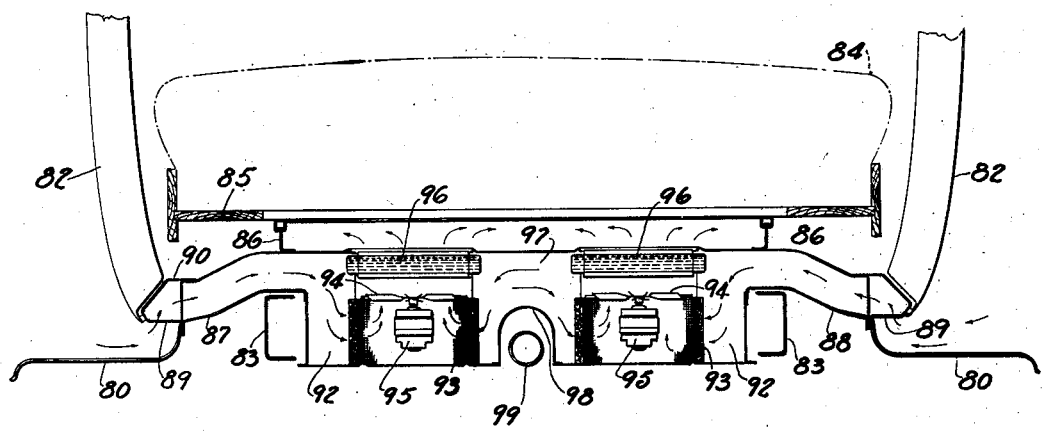
Figure 5 is a transverse sectional view of a modified form of the invention.

Considering now the form of invention shown in Figures 1 to 4, we have indicated in Figure 1 a vehicle 10 having a vehicle body provided with front doors 12 and a running board 13, and also provided with a front, transversely extending seat 14 which, as shown clearly in Figures 3 and 4, is mounted on the bracket 15 for fore and aft movement upon the supports 16 to adjust the position of the seat for various drivers. The supports 16 are bolted in any suitable manner to the floor board 17 as indicated at 18 in Figures 3 and 4.

The vehicle shown in Figure 1 is also provided with a steering post 19 extending through the dashboard or bulkhead 20 which at its lower end terminates in a toe board 22 through which the operating pedals 23 are adapted to extend. A suitable windshield 24 is provided and rearwardly of the windshield and therebeneath is disposed the usual instrument panel 25.

The heating means of the present invention is adapted to be supported upon the floor board 17 and comprises a heater unit 30 of the finned coil type such as commonly employed in previous conventional types of hot water heaters, and has the inlet connection 32 and outlet connection 33 extending from suitable headers in the heater forwardly through the conduits 34 and 35, respectively, to suitable connections at the engine or radiator of the vehicle. The floor board 17 is provided with a suitably shouldered opening 36 for receiving the top surface of the heater, and a suitable felt or resilient gasket member 37 is disposed between the headers 38 and 39 of the heater into the surface of the floor board to cushion the heater with respect to the floor board and to prevent the transmission of noises therebetween. These extend along the two longitudinal sides of the heater where the headers are located and the heater itself is supported upon a flange 40 of a supporting member 42 disposed below the heater and serving as a support for the fan 43 of the operating motor thereof. The member 42 is secured to the floor board by means of the supporting plates 45 which are suitably attached to the member 42 and at their upper ends are flanged, as indicated at 46, and are adapted to be secured to the floor board by means of bolts 47. The motor 44 is supported by a diagonally extending arm 48 which is connected to the member 42, as shown clearly in Figures 3 and 4.

The entire heater and fan assembly is housed within a substantially semi-cylindrical housing 50 secured at its top to the floor board 17 by means of the flange 52 which may be spot welded thereto or may be bolted thereto, and which at its bottom is closed by the bottom plate 53 which is preferably bolted to the flange 54 at the lower end of housing 50 as indicated by the bolts 55, or which may be welded thereto if desired.

The bottom plate 53 is provided with an annular raised rib portion 56 which forms a centering means for an annular filter 57 which may be of the type used in air cleaners and the like, comprising two coaxial metal screens having a metallic filler therebetween through which the air is adapted to pass and which serves as a filter for removing particles of dust and dirt from the air to thereby provide for admission of air to the fan and heater. The cleaner 57 is of an axial extent such that it closes the space between the lower end of the member 42 and the bottom plate 53, thereby causing all of the air which enters the fan chamber to pass through this filter and have the particles of dirt and dust removed therefrom.

Extending laterally from the chamber 60 formed by the member 50 and the bottom plate 53 is a duct which is provided by the continuation 62 of the floor board 17 at its upper surface and is defined by a bottom member 63 which extends over the channel-shaped side rail 64 and at its outer end is secured to the base of the door sill as indicated at 65. Also secured at the point 65 is the running board 13 which may be of any desired configuration and above this running board is the door sill member 66 which is engaged by the door 12 as it swings into position in line with the side of the vehicle. Suitable rubber padding 67 insures an air tight seal between the door 12 and the sill portion 66.

In order to admit air into the duct 68 formed by the wall portions 62 and 63, there is provided in the bottom of the door sill portion 66 a plurality of spaced openings 69 as indicated clearly in Figure 2. The openings 69 communicate with suitable openings 70 formed in the door sill member 66 which in turn open into the duct 68. It is thus apparent that air may pass from below the door 12 and above the running board through the opening 69 and the adjoining opening 70 into the duct 68 and may be drawn by the fan 43 through the cleaner 57 and forced upwardly through the heater 30 into the interior of the car.

Inasmuch as the openings 69 are below the openings 70, it is obvious that upon air being drawn through the openings 69 there will be no possibility of water also being drawn through these openings as any water carried by the air into the openings 69 will, by gravity, flow back through these openings on to the running board 13. This is an essential advantage in that it eliminates any possibility of water being pulled into the heating system and at the same time insures a positive supply of fresh, clean air to the heating means. It will also be noted that the openings 69 are so positioned as to be out of the way of direct drafts due to movement of the vehicle, and, consequently, no appreciable variations of pressure at the openings 69 will be produced so that the heating system will operate in a more or less constant manner.

When the fresh air from below the door of the vehicle is drawn through the chamber formed by the member 50 and forced upwardly through the heater 30, it is heated to an appreciable extent and is discharged into the space between the base 71 of the seat 14 and the floor board 17. As a result, the air must be directed both fore and aft of the vehicle body along the floor thereof from beneath the seat 14. This insures that the air will move along the floor around the feet of the occupants, thus providing warmth and comfort for both front and rear seat passengers and, due to convection currents, the air will rise upwardly to thereby insure a more or less uniform temperature throughout the interior of the vehicle. This is of distinct advantage in preventing frosting of windows as well as insuring complete comfort for all occupants of the car.

In addition, it will be noted by the arrows in Figure 1 that a certain portion of air being discharged forwardly from beneath the seat 14 will pass upwardly into the space between the dashboard 20 and the instrument panel 25. Thus, air which is collected in this space may be employed for defrosting the windshield as by means of the mechanism indicated diagrammatically at 72 which may include ducts leading up to the interior surface of the windshield 24 and which may be provided with a fan or the like, indicated at 73, if it is found necessary that positive conduction of air to the windshield is required.

It should be understood that the fan 43 in the present invention is of a capacity such that it forces the heated air, under pressure, into the interior of the vehicle. This prevents any possibility of unconditioned air passing into the interior of the vehicle through window cracks, door cracks or the like, and also serves for preventing the admission of dust into the interior of the car. Due to the fact that the air is under pressure within the vehicle, the vitiated air is exhausted through door cracks, windows and the like and the entire supply of conditioned air to the car is made up of fresh, outside air filtered and heated prior to admission to the interior of the body.

Considering now the embodiment of the invention disclosed in Figure 5, it is to be noted that the vehicle in this embodiment of the invention is provided with a running board 80 supported from the body of the vehicle and is provided with oppositely disposed doors 82 hinged to any type of body structure supported upon the channel-shaped side rails 83. A transversely extending seat 84 is provided, mounted upon a base 85 suitably supported for movement on the supports 86.

In this embodiment of the invention, two laterally extending ducts 87 and 88 are provided, each of which conducts fresh outside air from beneath the doors 82 through openings 89 in the door sill members 90 and ducts 87 and 88, to the conditioning chambers 92. Each of the conditioning chambers is provided with a filter 93, a fan 94 operated by the motor 95, and a heater 96 in much the same manner as described in connection with Figures 2, 3 and 4. However, the space between the chambers 92 is provided with a common connecting duct 97 which is provided with an arched portion 98 fitting over the propeller shaft 99 of the vehicle.

With this construction it is apparent that fresh air may be drawn from either side of the vehicle into either of the chambers 92 by reason of the cross connection 97 and, consequently, under very adverse wind conditions with a strong side wind on one side of the car, there would be no possibility of starving the heating means due to a vacuum produced on the opposite side of the vehicle.

Figure 6:
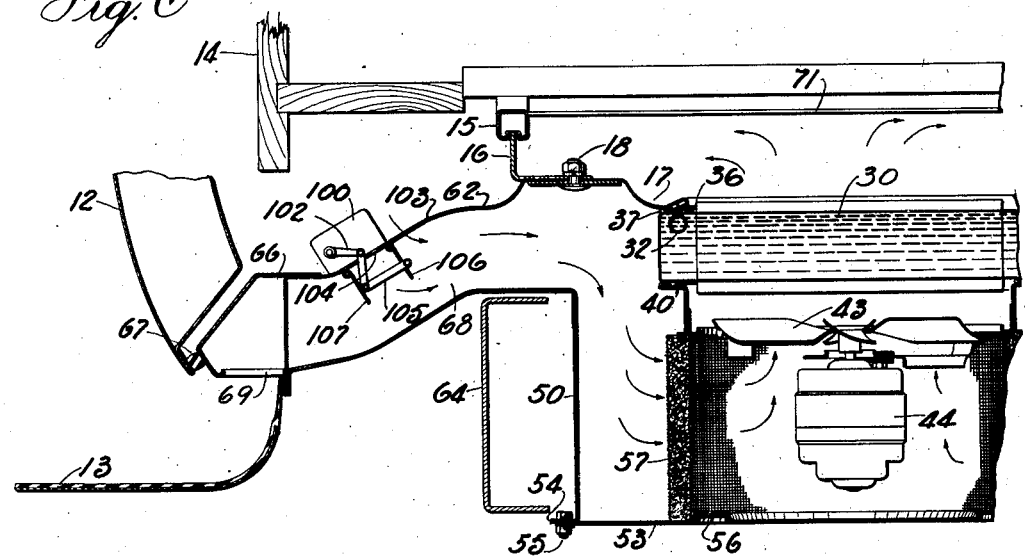
Figure 6 is a view similar to Figure 3, showing a still further modified form of the invention.

In the construction which is disclosed in Figure 6 the parts are substantially identical with those described in connection with Figure 3 with the exception that the portion 62 of the floor board has mounted thereon a hydrostat indicated at 100 and provided with an actuating arm 102. This hydrostat is responsive to humidity conditions within the vehicle so that if the heated air being admitted to the vehicle becomes too dry for comfort, the hydrostat may be set to operate for opening passageways 103 and 104 by means of the jointed connections 105 into the dampers 106 and 107, respectively. This provides for admission of air from within the car body into the duct 68 and inasmuch as moisture is introduced into this return air by the occupants of the vehicle in normal breathing action, a certain amount of humidity will be admixed with the fresh air by the mixing of this return air therewith in the duct 68. This, therefore, provides for increasing the humidity of the air being admitted to the heating system to produce a more comfortable condition within the vehicle if such is required due to extreme dryness of the outside air. However, this condition does not occur frequently and the installation of the hydrostat 100 is considered optional.

It is therefore believed apparent that we have provided a novel type of heating means for vehicles in which air may be drawn from the sides of the vehicle beneath the floor thereof, cleaned and heated, and discharged upwardly through the floor against the base of the front seat. This base then acts as a baffle for directing the air fore and aft beneath the seat around the feet of the occupants of the vehicle and a portion of the air may also be collected and used for windshield defrosting purposes. The construction shown is simple in design and operation and it is to be understood that it may be subjected to the same type of control as now used for securing any desired range of speed, while thermostatic controls may be employed for the heater to insure the proper temperature therein.

We are aware that a number of changes may be made in certain details of construction and design of the present disclosure and we therefore do not intend to be limited except as defined by the appended claims.

We claim:

1. A method of heating the interior of a vehicle having a seat and a floor, which comprises drawing air laterally below said floor from the side of the vehicle, heating said air, discharging it upwardly against the bottom of the seat, and deflecting said air by the bottom of the seat to direct it along the floor of the vehicle.

2. A method of heating the interior of a vehicle body having forward and rear seat compartments and a seat intermediate said compartments which comprises drawing air laterally through a duct positioned beneath the floor of said vehicle body, discharging said air upwardly against the bottom of said seat and heating the same during its upward movement, and directing said air along the floor of the vehicle body simultaneously into both compartments.

3. In a vehicle body having a floor, a seat spaced thereabove, a dashboard, an instrument panel spaced therefrom, and a windshield above said dashboard, the method of heating the interior of said body including said windshield which comprises drawing air laterally beneath the floor of said body into a heater chamber, discharging said heated air upwardly from said chamber through said floor against the base of said seat, directing said heated air fore and aft of said seat along the top of said floor, collecting a portion of the heated air in the space between said dashboard and instrument panel, and discharging said collected portion of air against the inner surface of said windshield.

4. In combination with the floor board of a vehicle having a seat mounted thereon, a heater disposed beneath said floor board and having an outlet opening therethrough, a chamber surrounding said heater having a duct extending laterally to one side of the vehicle, inlet openings in said duct at said side, and fan means in said chamber for drawing air through said duct and forcing the same out through said heater and the floor board against the bottom of said seat whereby the heated air is directed laterally along said floor board.

5. The combination of claim 4 having a filter for said air in said duct anterior to said heater.

6. In a vehicle having a floor, a seat having its base disposed above said floor to define a horizontal air passageway therebetween, means defining a chamber depending from said floor and having a laterally extending inlet, an annular air filter in said chamber, a fan mounted vertically in said chamber within said filter for drawing air from said inlet through said filter and discharging the same upwardly, and heating means through which said discharged air passes into said horizontal passageway.

7. In a vehicle having a floor, a seat having its base disposed above said floor to define a horizontal air passageway therebetween, means defining a chamber depending from said floor and having a laterally extending inlet, an annular air filter in said chamber, a fan mounted vertically in said chamber within said filter for drawing air from said inlet through said filter and discharging the same upwardly, and heating means beneath said seat through which said discharged air passes into said horizontal passageway.

8. In a vehicle having a floor, a seat having its base disposed above said floor to define a horizontal air passageway therebetween, means defining a chamber depending from said floor and having a laterally extending inlet, an annular air filter in said chamber, a fan mounted vertically in said chamber within said filter for drawing air from said inlet through said filter and discharging the same upwardly, and heating means above said fan through which said discharged air passes into said horizontal passageway.

9. In a vehicle having a floor, a seat having its base disposed above said floor to define a horizontal air passageway therebetween, means defining a chamber depending from said floor and having a laterally extending inlet, an annular air filter in said chamber, a fan mounted vertically in said chamber within said filter for drawing air from said inlet through said filter and discharging the same upwardly, and heating means intermediate said chamber and passageway through which said discharged air passes into said horizontal passageway.

10. The combination, in a vehicle having a floor, a seat having its base spaced above the floor to define therebetween a horizontal passageway opening both fore and aft of said seat, of a duct extending beneath said floor having an inlet opening at one lateral side of the vehicle, an annular chamber depending from said floor beneath said seat, means forming a passageway between said duct and chamber, air heating means disposed above said chamber and having outlets opening into said passageway, and a fan in said chamber for drawing air through said duct into said chamber and discharging said air through said heating means into said passageway beneath said seat.

11. In a vehicle having a floor, a seat having its base supported in spaced relation to said floor to define therebetween a horizontal air passageway, the method of heating the interior of said vehicle fore and aft of said seat which comprises, drawing fresh air in laterally from the side of said vehicle, conducting said air up over the side rail of the vehicle and thence into an annular chamber depending below said floor, filtering said air as it enters said chamber, discharging said air upwardly out of said chamber, deflecting the air as it is discharged upwardly to move it horizontally into said passageway, and heating said air at a point intermediate said chamber and said deflecting means.

12. In a vehicle having a heater disposed beneath the seat thereof, air circulating means therefor comprising a chamber depending below said heater having a central air passage therein defined by an annular filter, a fan supported in the upper end of said chamber coaxially within said filter, an annular air space surrounding said filter and having a laterally extending inlet duct opening out at the side of the vehicle, and deflecting means above said heater for directing the air drawn through said inlet past said filter and discharged through said heater horizontally beneath said seat.

13. An underseat heater for an automobile having a floor board provided with an opening therethrough, said heater comprising a depending support secured to the undersurface of said floor board about said opening, an annular air filter carried by said heater and defining a cylindrical chamber below the floor board in line with said opening, air inlet means communicating with the exterior of said filter, a fan motor disposed centrally in said chamber and having a vertically extending shaft, a fan on said shaft above said motor for drawing air through said filter, and heating means disposed above said filter for heating the air drawn through said chamber by said fan.

GEORGE E. ONISHI.
ALBERT M. NORMAN.